3,374,276
MANUFACTURE OF GUAIACOL
John Swidinsky, Newark, N.J., assignor to S. B. Penick & Company, New York, N.Y., a corporation of Delaware
Continuation-in-part of application Ser. No. 344,348, Feb. 12, 1964. This application Feb. 21, 1966, Ser. No. 529,158
9 Claims. (Cl. 260—613)

ABSTRACT OF THE DISCLOSURE

The invention relates to a process for converting catechol to guaiacol by treating catechol with a methyl halide in a closed reaction system at a temperature of between about 75–150° C. and at a pressure below about 300 pounds per square inch. The process is conducted in the presence of a water-soluble salt or hydroxide of a divalent metal, such as barium, calcium, lead or strontium, which divalent metal forms a water-insoluble sulfate and a catechol salt which are insoluble in water. The process is conducted in a solvent system made up of water and of a water-insoluble organic solvent which is not reactant with the catechol salt of the divalent metal and in which guaiacol is soluble. Desirably, when methyl chloride is employed, it is present in a mole ratio of 0.75 to 2.00 per mole of catechol.

---

Figure 1:
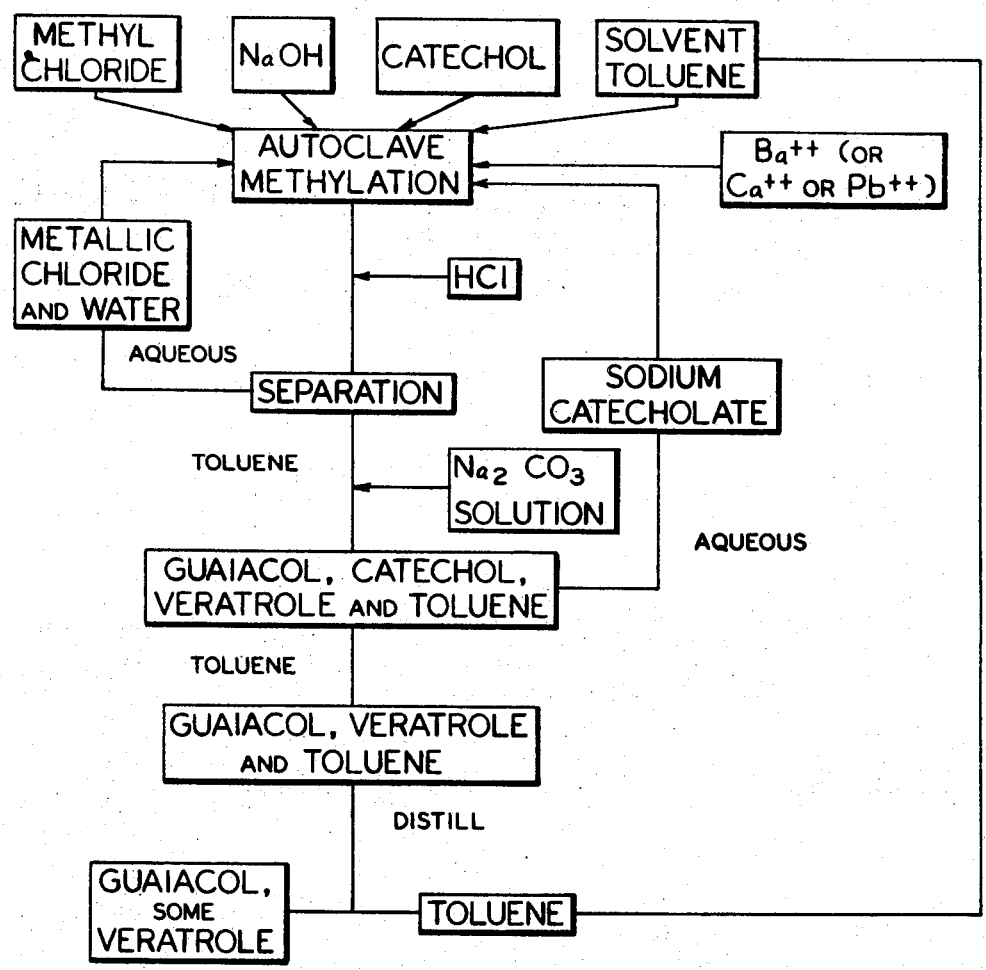

This application is a continuation-in-part of my copending application, Ser. No. 344,348, filed Feb. 12, 1964 and now abandoned.

This invention relates to the manfacture of guaiacol and more particularly to the manufacture of guaiacol from catechol and its salts.

Guaiacol has been among the most important catechol derivatives. It was first discovered by Unverdorben in the distillation products from guaiacum resin. It has been used directly as an expectorant but more recently it has been common to use it in the form of its derivatives such as glycerol guaiacolate to enhance this expectorant activity. It has also been used as an intermediate for synthesis of other chemicals.

Guaiacol has usually been prepared commercially by the diazotization of o-anisidine. It would be preferred to prepare guaiacol by methylation of catechol or its salts and several such syntheses have been proposed.

Catechol is available by hydrolysis of o-dichlorobenzene and o-chlorophenol and from natural products such as wool pulp lignin. Catechol has previously been converted into guaiacol by reacting with alkali salts of methylsulfuric acid at temperatures about 180° C. (Lieb. Ann. 147, 248 (1868) and also German Patent 593,193 (1934)). By this method, the product has been a mixture containing considerable amounts of veratrole (o-dimethoxybenzene). Guaiacol has also been prepared by the reaction of catechol, dimethyl sulfate and alkali hydroxides in aqueous media (M. Tanaka et al., J. Pharm. Soc. Japan; 525, 986 (1925)). In this case a ratio of guaiacol to veratrole of 6:4 was obtained as the final product. It should be noted that the methylating agent, dimethyl sulfate, is both expensive and toxic.

Catechol has also been reacted with dimethyl sulfate and alkali hydroxides in the presence of a water-immiscible solvent (German Patent 874,445 (1953)) to produce a product containing as little as 10% veratrole but still utilizing the relatively expensive and toxic methylating agent.

Guaiacol has also been prepared by the reaction of anhydrous monosodium catecholate with methyl chloride in an anhydrous solvent under pressure (German Patent 591,534 (1934)). The preparation of this salt requires the reaction of sodium metal with catechol in anhydrous alcohol, the removal of the alcohol, and then the transfer of the so-formed salt to another anhydrous organic solvent (chlorobenzene) for the methylation step.

Methyl chloride was also utilized as a methylating agent for catechol in the reaction with anhydrous barium salts of catechol suspended in anhydrous organic solvents at temperatures above 200° C. Under such conditions of temperature, pressures of about 130 atmospheres are produced. (German Patent 593,193 (1934).)

These latter two methods employed methyl chloride, a less expensive methylating agent than dimethyl sulfate and one that does not possess the extreme toxicity of dimethyl sulfate. However, both of these reactions are complicated in operation inasmuch as the first requires the use and handling of metallic sodium in anhydrous solvents and the latter requires high pressure equipment.

It is an object of this invention to provide a novel, low pressure method for the synthesis of guaiacol from catechol. It is another object of this invention to provide a method for the synthesis of guaiacol from catechol employing the relatively safe and economical methylating agent, methyl chloride, and utilizing such relatively low pressures and temperatures so that special equipment will not be necessary.

My invention resides in the concept of the monomethylation of water-insoluble divalent salts of catechol to guaiacol at pressures below 300 pounds per square inch (20 atmospheres) and at temperatures in the range of 75 to 150° C., by performing the methylation reaction in a three-phase system consisting of water; the water-insoluble divalent catechol salt; and a water-immiscible solvent, non-reactive with the catechol salt. I have found that by using a three-phase system under the reaction conditions set forth as within the scope of my invention, only small amounts of veratrole are formed.

It is believed that the desired monomethylation occurs exclusively under the stated conditions, in the aqueous phase, on the reactive form of the metallic catechol salt present in the equilibrium mixture to form the undissociated guaiacol. This is then effectively removed into the non-polar organic phase and made unavailable for further methylation to veratrole. Simultaneously with the removal of the reactive form of the metallic catecholate from the equilibrium mixture by methylation, an equivalent quantity of the reactive species is generated by reestablishment of the equilibrium. Lower than theoretical conversion to guaiacol and recovery of unreacted catechol occurs due to concomitant hydrolysis of methyl halide, such as methyl chloride, during the methylation reaction; the increase in the acidity of the reaction medium thereby results in the formation of an un-ionized catechol unavailable for methylation. Under the pressure and temperature conditions set forth above, it has been found that when the water-phase is omitted, no guaiacol is formed. When the reaction is run in water in the absence of the water-immiscible solvent, the reaction conditions favor the formation of veratrole. Further methylation of guaiacol in aqueous systems appears to occur so rapidly that the monomethylether can hardly be isolated or recovered in commercially economic quantities.

The organic solvents in which this reaction may best be carried out are those which will dissolve guaiacol and have a sufficiently low vapor pressure to permit the reaction to proceed at temperatures in the range of 75 to 150° C. and at pressures below 300 p.s.i. By choosing higher boiling solvents, the pressures generated are, for the most part, dependent on the vapor pressure of the methyl halide, such as methyl chloride, in the particular solvent system.

The metals for forming the catechol salts are those which precipitate sulfate ions from aqueous solutions and include barium, calcium, strontium and lead. The barium, calcium and strontium salts are preferred when the products are intended for use as pharmaceuticals as it is most difficult to remove the last traces of lead. The metal catechol salts are intermediate products in the hydrolysis of o-dichlorobenzene. U.S. Patents 1,969,792; 1,970,363; 1,970,364 and 2,001,014 describe the preparation of the catechol salts used as starting materials for this invention. From a theoretical point of view there is some question whether the salts in their reactive forms are the full salts (1 M:1 catechol) or whether they are biscatecholates (1 M:2 catechol). However, whichever they are makes no difference for the purposes of this invention. As used in the process of this invention, the salts may be used directly or formed in situ by the use of catechol, mineral acid salts of the active metals and some alkali which are added to the reaction mixture.

Among the various solvents useful in this invention there may be mentioned the chlorinated hydrocarbons useful as the guaiacol-removing phase and this class includes hexachloroethane, 1,3-dichloropropane, trichloroethylene, 1,1,1 - trichloroethane, 1 - chlorododecane, 1-chlorohexane, 1-chlorooctadecane, 1,4-dichlorobutane, 2-chlorooctane, 1-chlorohexadecane, 1-chlorodecane and cis-1,2-dichloroethylene.

Among the aromatic halogenated hydrocarbons useful in this guaiacol-removing phase are chlorobenzene, 1-chloronaphthalene, ortho-chlorotoluene, paradichlorobenzene, ortho-dichlorobenzene, meta dichlorobenzene, 2 - chloronaphthalene, meta chlorotoluene, 1-chloro-2-fluorobenzene, 1 - chloro - 3 - fluorobenzene, 2,4-dichlorotoluene and difluorobenzenes.

Among the non-halogenated hydrocarbons useful in guaiacol-removing phase are the liquid hydrocarbons below 10 carbons in chain length such as hexane and heptane but including octane and nonane as well, and the aromatic hydrocarbons including benzene, toluene and xylene. The mononitro derivatives of the aromatic hydrocarbons similarly may be used without seriously interfering with the reaction as may the higher boiling aliphatic ethers such as diisopropyl ether. In general, any common solvent, inert to the metal catecholate and with a high solvating action on guaiacol will serve as the solvent phase in this reaction. The reaction proceeds economically at temperatures in the range of 75–150° C. The pressures within the system are those autogenously generated within the closed system containing the methylating agent, the metal catecholate, water and the solvent. Since the methylating agent, namely, a methyl halide, such as methyl chloride, is the most volatile component, its vapor pressure in the solvent system at the temperature in the above range determines the pressures generated within this closed system.

In batch processing, the reaction is initiated by charging the catechol salt into the vessel containing the solvent and water and then introducing the methyl halide, such as methyl chloride or methyl bromide. Instead of the catechol salt, catechol, alkali and a salt of the active metal can be introduced into the reacting vessel and the catecholate formed in situ. As the temperature is raised to the reaction range, it is found that autogenously generated pressures become constant and then as the reaction proceeds to completion the pressure within the system falls. The reaction is operable in batch processing procedures where the reactants are mixed in a vessel which then is sealed and heated. The reaction under those conditions can be followed by the drop in pressure of the enclosed system. The unreacted catecholate or any free catechol can be recycled in subsequent batches with new starting materials and recovered solvents.

The reaction is also operable in a continuous reaction system where the metal catecholate, suspended in water, is injected into the proximate end of a reactor such as a tube reactor with the methyl halide, such as methyl chloride or methyl bromide, and the solvent-water mixture. The reaction is initiated in the heated areas of the tube reactor and the finished products together with the by-products, unreacted starting material, and solvents are pumped from the cool distant end of the tube reactor.

The temperature and pressure ranges of this continuous system are in the range set forth above. The reaction time can be adjusted by the length of the heated section of the tube reactor, the rates of injection of reactants and/or the rate of pumping of the components.

After the reaction has been completed, the reacted mixture is cooled and treated with dilute hydrochloric acid to liberate the metal salt (for example barium) in the form of the chloride which dissolves in the water layer. The organic solvent layer contains the newly formed guaiacol as well as part of the unreacted catechol freed from its salt form. The aqueous layer may be extracted with a suitable solvent such as ether or ethyl acetate to remove any remaining catechol which may be dissolved therein. The combined solvent mixture is distilled and the residue is subjected to vacuum distillation. At 10 millimeters of mercury the guaiacol distills at 80° C. and the unreacted catechol distills at approximately 130° C. Based on the metal catecholate, the overall yield achieved, including recovered catechol, has reached 90% under the most favorable conditions.

Figure 2:
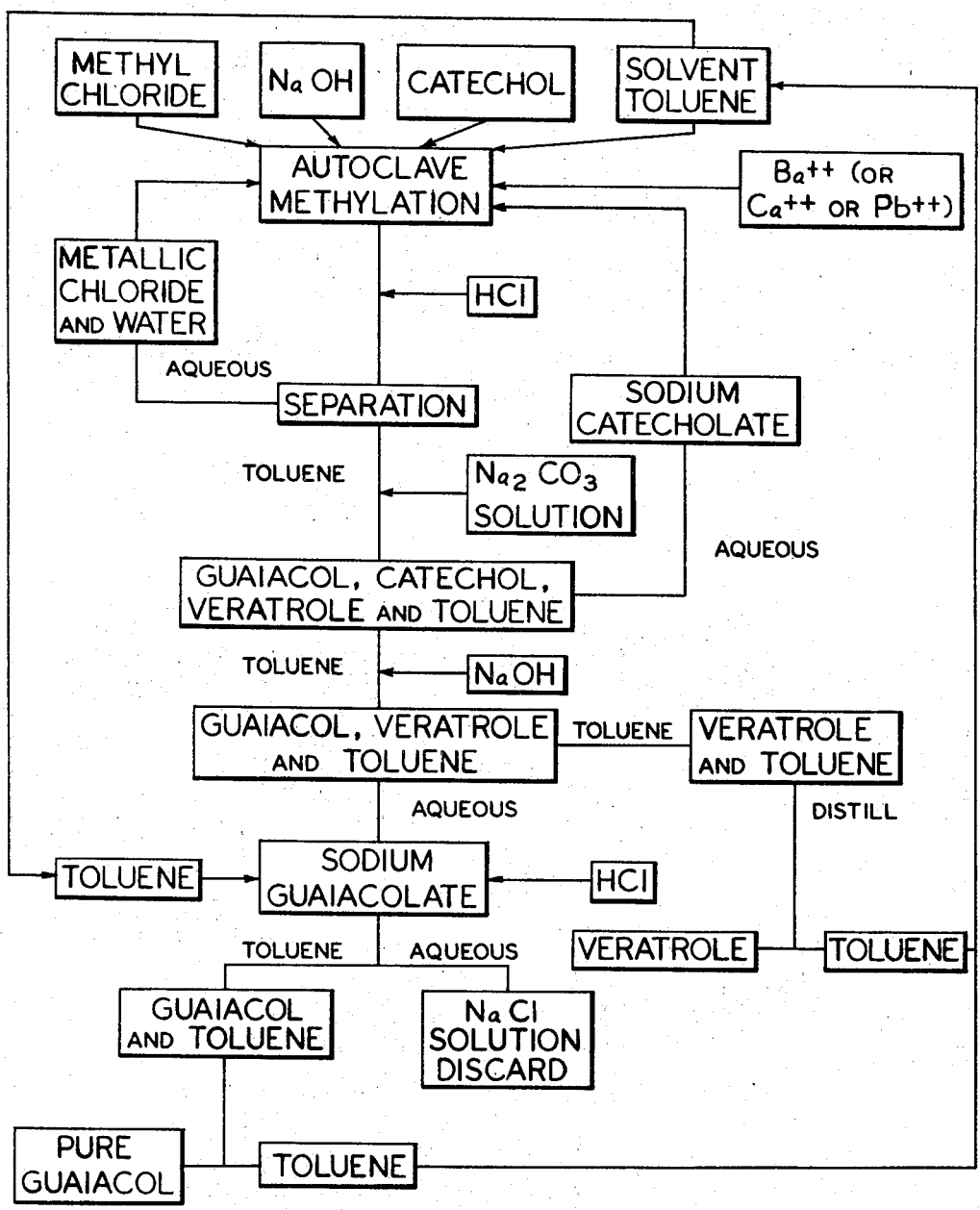

The invention will be more particularly described in conjunction with the drawing where FIG. 1 is a block-diagram flowsheet of the process designed to yield technical guaiacol and FIG. 2 is a block-diagram flowsheet of the process designed to yield a product freed from traces of veratrole. In both figures, methyl chloride is used as the example of the methyl halide.

Referring to FIG. 1, a low pressure autoclave (300 p.s.i.g. rating) is charged to at least ½ its volume with a mixture of water and an equal weight of the organic solvent. The residual space in the autoclave is flushed with nitrogen and the metallic catecholate as a mixture of catechol, metallic salt or hydroxide (barium, calcium, strontium or lead) and caustic is charged into the autoclave. The mixture is stirred and heated at least to the initiation temperature (75° C.) and an equimolar portion of methyl halide, such as methyl chloride or methyl bromide, is pumped into the autoclave (1½ lb. moles each of reactants is an economic charge for a 300 gallon autoclave). When the gauge pressure in the autoclave begins to fall at constant temperature, the stirring of the mixture is continued further for about ½ hour. The contents of the autoclave are drained into a separator and acidified. The hot aqueous phase is separated; this contains the metallic halide which may be recovered and recycled. The heated organic solvent phase is treated with a 10% solution of sodium carbonate in water which is then separated from the organic solvent layer. This aqueous sodium carbonate phase contains the unreacted catechol which is also reserved for return as such to the autoclave for recycling. The organic solvent phase contains a crude guaiacol which can be recovered after distilling off the organic solvent. This crude guaiacol may contain up to about 8% of veratrole.

Referring now to the flowsheet of FIG. 2, the autoclave is charged with a solution of the metallic chloride in water and the organic solvent is added thereto. The catechol is then introduced and the mixture is heated in the autoclave above the initiation temperature wherein the methyl chloride is slowly pumped into the autoclave. The amount of methyl chloride is equimolar to the amount of catechol used. When the introduction of the methyl chloride is completed, the gauge pressure is observed and when it begins to fall, at constant temperature, stirring is continued for an additional ½ hour. The contents of the autoclave are then drained into the separator and acidified with hydrochloric acid. The hot aqueous phase that is separated contains the metallic chloride salt and may be recycled. The organic solvent phase at about 90° C. is treated with a 10% aqueous sodium carbonate solution which is then separated from the organic solvent layer. This aqueous phase containing unreacted catechol is reserved for recycle. The organic solvent solution is then cooled and treated with a 25% aqueous solution of sodium hydroxide. The aqueous solution layer thus contains the guaiacol in the form of its sodium salt and the organic solvent contains the veratrole. The organic solvent is removed by distillation and may be recovered and purified for recycling. The aqueous layer containing the guaiacol in the form of its sodium salt is then neutralized with acid and extracted with successive portions of toluene. The toluene portions are consolidated and the toluene is removed by distillation leaving a purified guaiacol assaying approximately 99% guaiacol and containing no veratrole.

The invention will be further described in the appended examples. Appropriate changes in reactants, conditions and reaction vessels may be made in a manner normally employed by those having the usual skill in this art. Such changes are deemed to be equivalent and within the scope of the appended claims.

Example 1

Using a stirred pressure vessel and following the reaction scheme according to FIG. 2, a mixture of 0.5 mole of barium chloride, 1.0 mole of caustic soda, 1.0 mole of catechol, 600 grams of water, and 600 ml. of propylene dichloride was heated at 75° C. A total charge of 0.93 mole of methyl chloride was added in increments to the reaction mixture while stirred and heated for a period of five hours in the range of 110–130° C. The gauge pressure reached a maximum of 80 p.s.i. The yield of guaiacol was 60%, veratrole 5% and 29% of catechol was recovered unchanged.

Example 2

Following the procedure of Example 1 with toluene as a solvent gave 52% guaiacol and 2% veratrole. The gauge pressure never exceeded 75 p.s.i.

Example 3

Following Example 1 with calcium chloride instead of barium chloride gave 50% guaiacol and 7% veratrole.

Example 4

Following Example 1 but using lead chloride instead of barium chloride gave 45% guaiacol and 1% veratrole.

Example 5

Using a pressure autoclave and following the reaction scheme of FIG. 2 with an aqueous slurry of 0.50 mole barium hydroxide octahydrate per mole of catechol as the metal salt and ethylene dichloride as the organic solvent, but charging 1.5 moles methyl chloride per mole of catechol at one time, there was obtained 46% guaiacol. The temperature range during the reaction was 130–140° C.

Example 6

Following the procedure of Example 5 but using 1.0 mole of barium hydroxide octahydrate per mole of catechol, there was obtained 34% guaiacol, 1% veratrole and 17% recovered catechol.

Example 7

Following the procedure of Example 5 but using calcium hydroxide gave 30% guaiacol and 1% veratrole.

Example 8

Following the procedure of Example 5 but under anhydrous conditions (the water was removed by azeotropic distillation of all the components prior to addition of the methyl chloride) and maintaining stirring and temperature for a 24 hour period, no guaiacol was formed. Examination of the reaction mixture for chloride ion to indicate initiation of the reaction showed only faint traces.

Example 9

Following the procedure of Example 5 but eliminating the organic solvent, wherein the methyl chloride was added directly into the aqueous mixture of catechol and barium hydroxide gave 12% guaiacol, 51% veratrole, and 24% of recovered catechol.

Example 10

Following the procedure of Example 5 but using a mixture of 0.25 mole each of barium chloride and barium hydroxide per mole of catechol, there was obtained a yield of 54% guaiacol and 35% recovered catechol.

Example 11

Following the procedure of Example 10 but operating at 140–150° C. gave 53% gaiacol and 27% recovery of unreacted catechol.

Example 12

Following the procedure of Example 10 but using o-dichlorobenzene as the organic solvent yielded 55% guaiacol and 24% of recovered catechol.

Example 13

Following the procedure of Example 10 but using heptane as the organic solvent yielded 54% guaiacol and 25% of recovered catechol.

Example 14

Following the procedure of Example 10 but using propylene dichloride as the organic solvent yielded 60% guaiacol and provided a 23% catechol recovery.

Example 15

Following the procedure of Example 10 but using benzene as the organic solvent and maintaining the temperature at 90–100° C. yielded 55% guaiacol and provided a 24% catechol recovery.

Example 16

Following the procedure of Example 10 but using toluene as the organic solvent yielded 59% guaiacol and provided a 26% catechol recovery.

Example 17

A slurry of the product obtained directly from the hydrolysis of o-chlorobenzene with caustic and barium chloride was neutralized to a pH of 9–10 with aqueous hydrochloric acid and subjected to the methylating conditions of Example 5 with toluene as the organic phase gave a 22% yield of guaiacol based on the o-dichlorobenzene originally charged.

Example 18

A mixture of 55 grams (0.5 mole) of catechol, 80 grams (0.52 mole) of barium hydroxide octahydrate, 50 g. (0.51 mole) of methyl bromide in 175 ml. of chloroform, and 50 ml. of water was heated in a rocking autoclave for 2–3 hours at 100–120° C. It was then allowed to rock overnight without any heat. No residual pressure was found. The contents of the autoclave were removed, acidified, by the addition of 10 ml. concentrated hydrochloric acid, filtered, and the chloroform solution separated from the aqueous phase. The chloroform solution was washed once with 250 ml. of water, and dried over sodium sulfate. The solvent was removed and the residue vacuum distilled to yield 40.7 grams (65.6%) of crude guaiacol having a boiling point 76–79° C. at 5 mm. of mercury pressure. The infra-red spectrum of this substance was identical to that of an authentic sample of guaiacol.

What is claimed is:

1. The method of preparing guaiacol which comprises treating catechol with a methyl halide within a closed system at a temperature between about 75 and 150° C. and at a pressure below about 300 pounds per square inch in the presence of a member selected from the group consisting of the water-soluble mineral acid salts and hydroxides of the divalent metals barium, calcium, strontium and lead, the divalent metal of said member of said member and catechol forming a water-insoluble salt, in a solvent system comprising water and a water-insoluble organic solvent which is not reactive with the catechol salt of said divalent metal and in which guaiacol is soluble; said water and said water-insoluble organic solvent and the water-insoluble divalent metal salt of catechol which forms in the method providing a three-phase system.

2. The method according to claim 1 wherein the divalent metal is barium.

3. The method according to claim 1 wherein the divalent metal is calcium.

4. The method according to claim 1 wherein the divalent metal is lead.

5. The method according to claim 1 wherein the divalent metal is strontium.

6. The method according to claim 1 wherein the total amount of the divalent metal salt and hydroxide ranges upward from one quarter mole equivalent of catechol.

7. The method according to claim 1 wherein the methyl halide is methyl chloride.

8. The method according to claim 7 wherein the methyl chloride is present in a mole ratio of 0.75 to 2.00 per mole of catechol.

9. The method according to claim 1 wherein the methyl halide is methyl bromide.

References Cited

UNITED STATES PATENTS

| 1,966,635 | 7/1934 | Marx et al. | 260—613 |
| 2,024,534 | 12/1935 | Marx | 260—613 |

BERNARD HELFIN, *Primary Examiner.*